(12) United States Patent
Hsu Li

(10) Patent No.: US 6,827,318 B1
(45) Date of Patent: Dec. 7, 2004

(54) SUPPORT DEVICE FOR ATTACHING OBJECTS TO VEHICLE

(76) Inventor: Hsiu Chu Hsu Li, P.O. Box 4-67, Hsin Chuang, Taipei (TW), 242

( * ) Notice: Subject to any disclaimer, the term of this patent is extended or adjusted under 35 U.S.C. 154(b) by 0 days.

(21) Appl. No.: 10/352,807

(22) Filed: Jan. 25, 2003

(51) Int. Cl.$^7$ .............................................. F16M 13/00
(52) U.S. Cl. ..................... 248/160; 224/558; 248/309.1
(58) Field of Search ............................. 248/160, 311.2, 248/224.8, 224.7, 220.21, 309.1; 224/558, 926

(56) References Cited

U.S. PATENT DOCUMENTS

| | | | | |
|---|---|---|---|---|
| 5,154,380 A | * | 10/1992 | Risca ........................... | 248/15 |
| 5,398,898 A | * | 3/1995 | Bever .......................... | 248/154 |
| 5,878,986 A | * | 3/1999 | Sun et al. .................. | 248/311.2 |
| 5,988,572 A | * | 11/1999 | Chivallier et al. ........ | 248/176.1 |
| 6,099,062 A | * | 8/2000 | Siegel ...................... | 296/37.12 |

* cited by examiner

Primary Examiner—Ramon O. Ramirez

(57) ABSTRACT

A support device for attaching objects to vehicles includes two or more plates received in a housing, and guided to move radially in and out of the housing, and a moving device to move the plates radially in and out of the housing, and to detachably secure the housing to the vehicles, such as to the cup holders of the vehicles. A bolt is rotatably attached to the housing, a follower is threaded to the bolt and has one or more inclined channels, the plates each has an inclined board sildably received in the inclined channels of the follower, to guide the plates to move radially in and out of the housing when the bolt is rotated relative to the follower.

16 Claims, 5 Drawing Sheets

SUPPORT DEVICE FOR ATTACHING OBJECTS TO VEHICLE

BACKGROUND OF THE INVENTION

1. Field of the Invention

The present invention relates to a support device, and more particularly to a support device for securing or attaching or supporting various objects to vehicles, such as to cup holders of vehicles.

2. Description of the Prior Art

Typically, vehicles may include one or more cup holders provided thereon to support cups or the like. However, the other objects, such as portable phones, adapters, etc. may not be attached to or supported on the cup holders.

The present invention has arisen to mitigate and/or obviate the afore-described disadvantages of the conventional problems to support objects on cup holders of vehicles.

SUMMARY OF THE INVENTION

The primary objective of the present invention is to provide a support device for securing or attaching or supporting various objects to vehicles, such as to cup holders of vehicles.

In accordance with one aspect of the invention, there is provided a support device for supporting and attaching objects to vehicles, the support device comprising a housing for supporting the objects, a first and at least one second plates slidably received in the housing, and guided to move radially in and out of the housing, and means for moving the first and the second plates radially in and out of the housing, to detachably secure the housing to the vehicles, such as to the cup holders of the vehicles.

The moving means includes a bolt rotatably attached to the housing, and means for coupling the bolt to the first and the second plates, and a control ferrule secured to the bolt, in order to rotate the bolt relative to the housing.

A flexible member may further be provided and attached to the control ferrule. The control ferrule includes a cavity formed therein, the flexible member includes a first end having a coupler engaged into the cavity of the control ferrule. The flexible member includes a bracket and/or a catch provided thereon to support the objects.

The coupling means includes a follower having a barrel threaded to the bolt, and a first and at least one second guide channels provided therein, and a board provided on each of the first and the second plates and slidably engaged in the first and the second guide channels of the follower.

The follower includes at least two flaps and at least two beams to define the first and the second guide channels thereof respectively. The flaps and the beams of the follower are preferably inclined relative to the barrel of the follower.

The first and the second plates each includes a bulge extended therefrom, and having the board provided on the bulge. The follower includes at least two gaps defined between the flaps thereof to slidably receive the bulges of the first and the second plates.

A guiding device may further be provided for guiding the first and the second plates to move radially in and out of the housing, and includes a recess formed in each of the first and the second plates, and at least two fences extended from the housing and slidably engaged in the recesses of the first and the second plates respectively.

The guiding device includes a cover attached to the housing and having at least two tracks provided thereon, the first and the second plates are slidably engaged on the tracks of the cover respectively.

The first and the second plates each includes an extension extended therefrom and having a slot formed therein to slidably receive the tracks of the cover respectively. The housing includes at least two bars extended therefrom and at least two gaps defined between the bars of the housing to slidably receive the first and the second plates respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
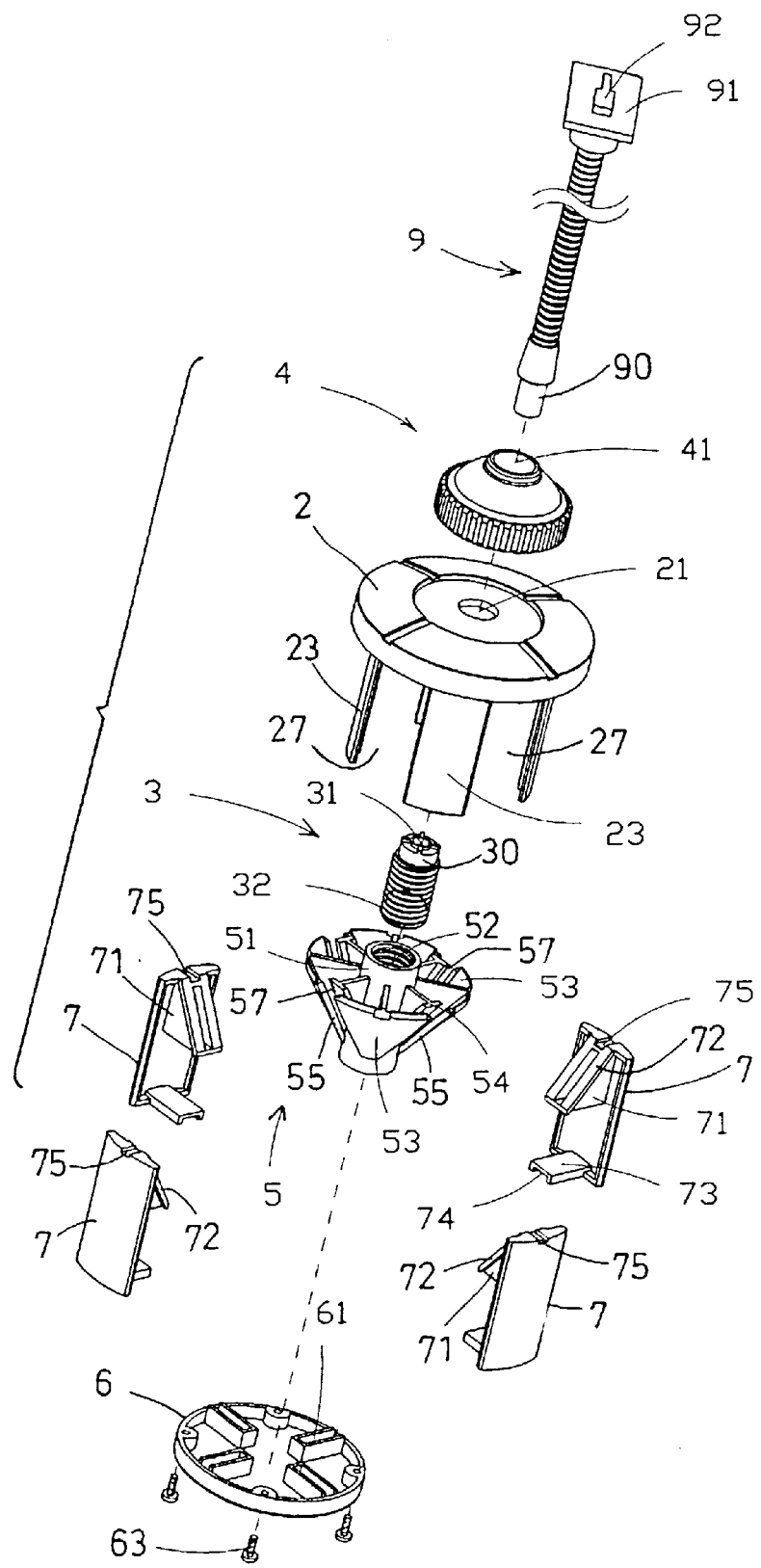
FIG. 1 is an exploded view of a support device in accordance with the present invention.
Figure 2:
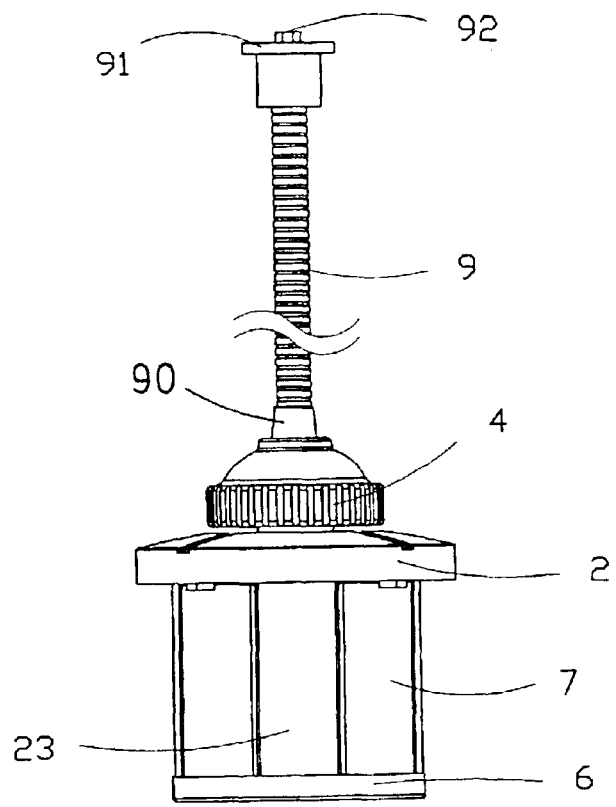
FIG. 2 is a front plan view of the support device.
Figure 3:
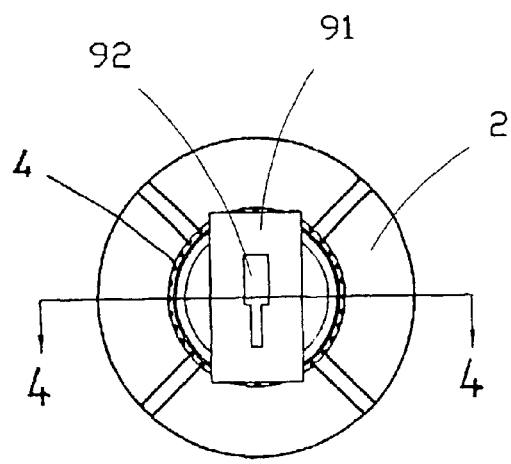
FIG. 3 is a top plan view of the support device.

Referring to the drawings, and initially to FIGS. 1–4, a support device in accordance with the present invention comprises a housing 2 including an orifice 21 formed therein, such as formed in the upper and center portion thereof, a cylindrical member 22 extended downwardly therefrom and arranged around the orifice 21 thereof, one or more bars 23 extended downwardly from the outer peripheral portion thereof, and gaps 27 formed or defined between the bars 23.

A bolt 3 includes a non-threaded upper portion 30 rotatably engaged in the orifice 21 of the housing 2, and includes a bore 31 formed therein, and includes an outer thread 32 formed on the outer peripheral portion thereof. A control ferrule 4 is rotatably attached onto the upper portion of the housing 2. A fastener 33 (FIG. 4) is engaged through the bore 31 of the bolt 3, and threaded to the control ferrule 4, in order to secure the bolt 3 to the control ferrule 4, for allowing the bolt 3 to be rotated relative to the housing 2 by the control ferrule 4.

The control ferrule 4 includes a cavity 41 formed in the upper portion thereof. A flexible member 9 includes a coupler 90 attached or provided on one end thereof for detachably engaging or securing into the cavity 41 of the control ferrule 4 with such as force-fitted engagements, fasteners, latches, or the like. The flexible member 9 includes a bracket 91 provided on the other end thereof and having a catch 92 for supporting or attaching mobile or portable phones 93 with seats or typical charging bases 94 or the like. The other objects (not shown) may be attached to the housing 2 with fasteners, latches, catches, hooks, or the like.

A follower 5 includes a barrel 51 having an inner thread 52 formed therein, and threaded with the outer thread 32 of the bolt 3, for allowing the follower 5 to be moved up and down relative to the housing 2 when the bolt 3 is rotated or threaded relative to the follower 5. The follower 5 includes one or more flaps 53 and one or more beams 54 disposed around the outer peripheral portion thereof and inclined relative to the barrel 51.

As best shown in FIG. 1, the flaps 53 are spaced away from each other and having grooves 55 formed therebetween, the beams 54 are parallel to the flaps 53, but include an outer diameter smaller than the inner diameter of the flaps 53, for forming or defining one or more guide channels 57 between the flaps 53 and the beams 54.

One or more plates 7 are slidably received in the housing 2, and parallel to the bars 23, and each includes a bulge 71 extended therefrom and slidably engaged in the grooves 55 of the follower 5 respectively, and each includes an inclined board 72 laterally extended from the bulge 71 and having an inclination similar to that of the flaps 53 and beams 54 of the follower 5, and slidably engaged in the respective guide channels 57 of the follower 5, such that the plates 7 may be guided to move relative to the follower 5 by the sliding engagement of the inclined board 72 in the respective guide channels 57 of the follower 5.

A cover 6 is secured to the bottom of the housing 2 or of the bars 23 with fasteners 63, and includes one or more tracks 61 provided thereon. The plates 7 each includes an extension 73 extended from the bottom portion thereof, and having a slot 74 formed therein to slidably receive the respective tracks 61, and thus to guide the plates 7 to move radially in and out of the housing 2 (FIGS. 5, 6).

The plates 7 each further includes a recess 75 formed or provided in the upper portion thereof. The housing 2 includes one or more fences 24 (FIGS. 4–7) formed or provided therein to slidably engage into the respective recesses 75 of the plates 7, and thus to further guide the plates 7 to move radially in and out of the housing 2 (FIGS. 5, 6). The plates 7 may be moved radially out through the respective gaps 27 that defined between the bars 23 of the housing 2.

It is to be noted that the plates 7 are slidably retained between the fences 24 of the housing 2 and the tracks 61 of the cover 6, such that the plates 7 may not move up and down relative to the housing 2 and the cover 6, and may only be guided to move radially in and out of the housing 2.

Figure 4:
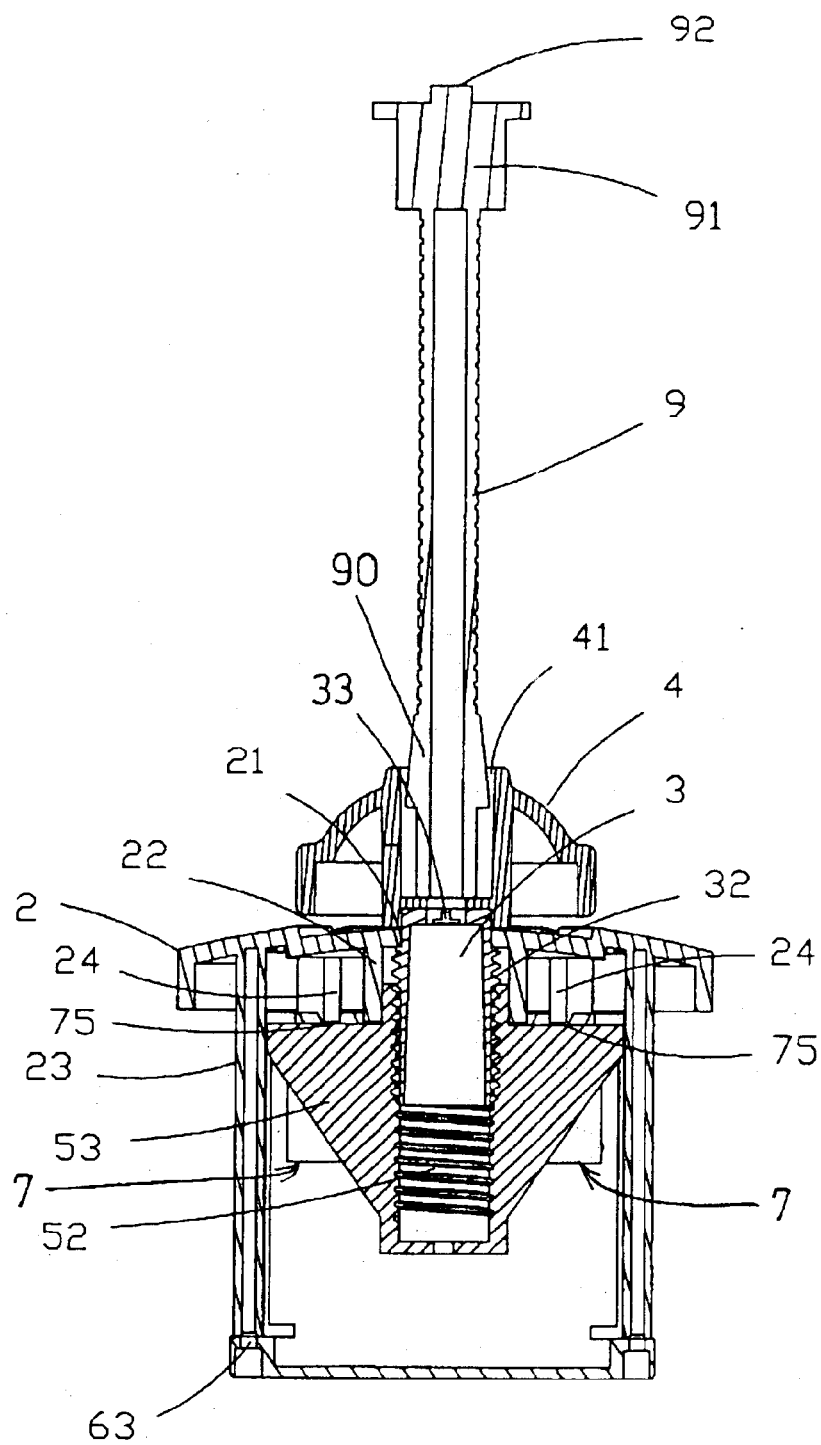
FIG. 4 is a cross sectional view taken along lines 4—4 of FIG. 3.
Figure 7:
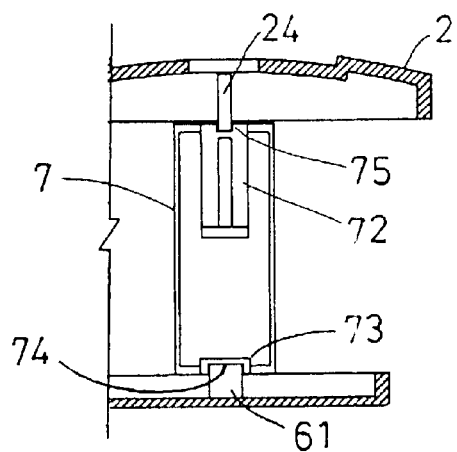
FIG. 7 is an enlarged partial cross sectional view taken along lines 7—7 of FIG. 5.
Figure 6:
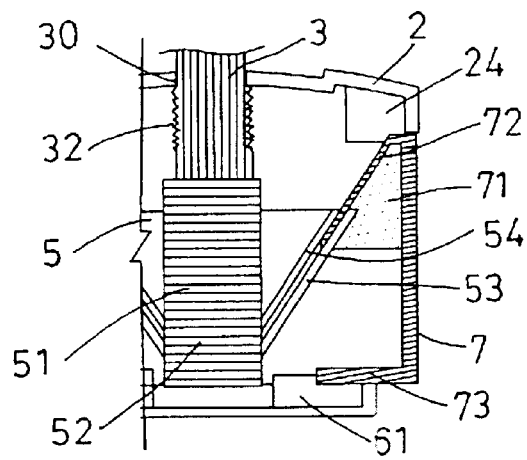
FIGS. 5, 6 are enlarged partial cross sectional views illustrating the operation of the support device.
Figure 5:
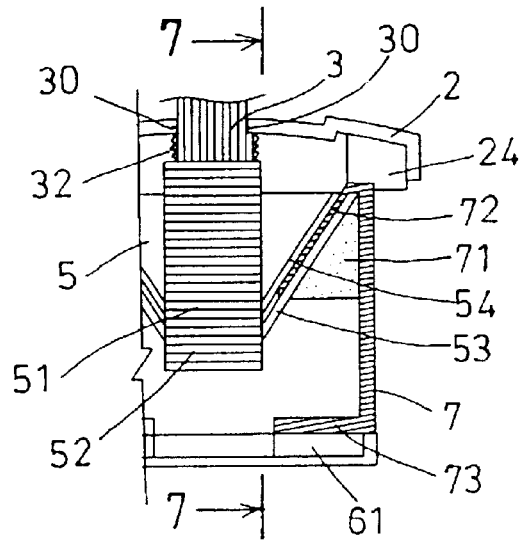

In operation, as shown in FIGS. 4–6, the barrel 51 of the follower 5 may be moved up and down relative to the housing 2 by rotating the bolt 3 relative to the follower 5 with such as the control ferrule 4. When the follower 5 is moved up and down relative to the housing 2, the inclined boards 72 of the plates 7 may be guided to slide along the respective guide channels 57 of the follower 5 or guided to move along the respective flaps 53 and beams 54, such that the plates 7 may only be guided to move radially in and out of the housing 2.

Figure 8:
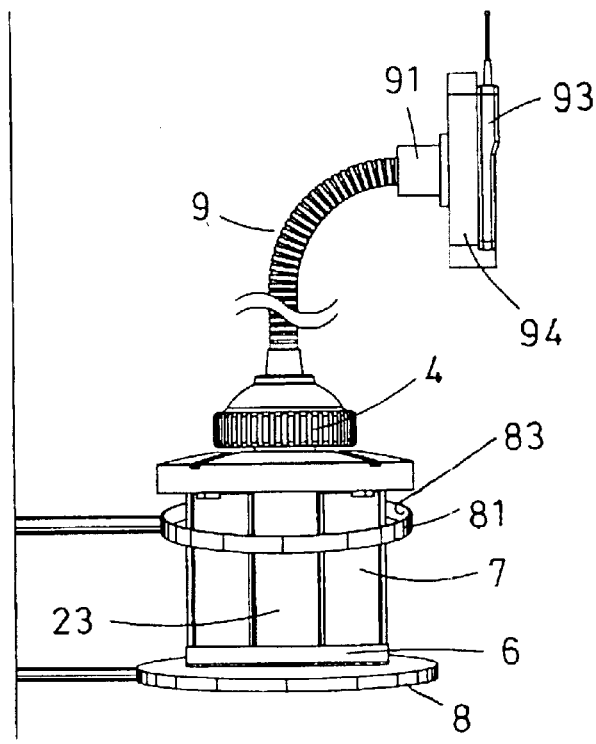
FIG. 8 is a perspective view illustrating the operation of the support device.
Figure 9:
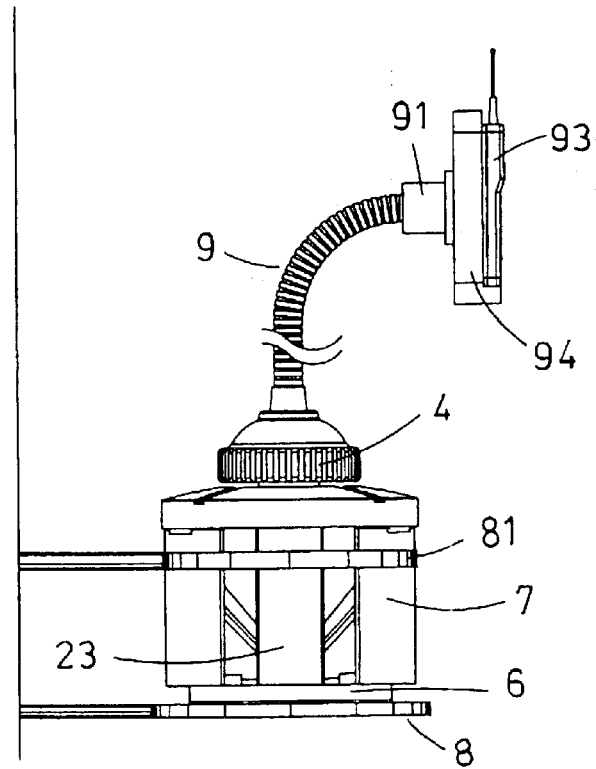
FIG. 9 is a plan schematic view illustrating the operation of the support device.

As shown in FIGS. 8 and 9, one or more cup holders 8 may be provided in some of the vehicles, and comprise a retainer 81 having a chamber 83 formed therein to receive the housing 2. The plates 7 may be moved radially out to engage with the retainer 81 of the cup holder 8 and to detachably secure the plates 7 and the housing 2 to the retainer 81 by rotating the bolt 3 relative to the barrel 51 of the follower 5, such that the housing 2 and thus the flexible member 9 and the mobile or portable phones 93 or the charging bases 94 or the like may thus be attached to or supported in the cup holder 8 of the vehicles.

Accordingly, the support device in accordance with the present invention may be used for securing or attaching or supporting various objects to vehicles, such as to the cup holders of vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device for supporting and attaching objects to vehicles, said support device comprising:
    a housing for supporting the objects, said housing including at least two bars extended therefrom and at least two gaps defined between said at least two bars of said housing,
    a first and at least one second plates slidably received in said at least two gaps of said housing, and guided to move radially in and out of said housing, and
    means for moving said first and said at least one second plates radially in and out of said housing, to detachably secure said housing to the vehicles.

2. The support device as claimed in claim 1, wherein said moving means includes a bolt rotatably attached to said housing, and means for coupling said bolt to said first and said at least one second plates.

3. The support device as claimed in claim 1 further comprising means for guiding said first and said at least one second plates to move radially in and out of said housing.

4. A support device for supporting and attaching objects to vehicles, said support device comprising:
    a housing for supporting the objects,
    a first and at least one second plates slidably received in said housing, and guided to move radially in and out of said housing,
    means for moving said first and said at least one second plates radially in and out of said housing, to detachably secure said housing to the vehicles, said moving means including a bolt rotatable attached to said housing, and
    means for coupling said bolt to said first and said at least one second plates, said moving means including a control ferrule secured to said bolt, in order to rotate said bolt relative to said housing.

5. The support device as claimed in claim 4 further comprising a flexible member attached to said control ferrule.

6. The support device as claimed in claim 5, wherein said control ferrule includes a cavity formed therein, said flexible member includes a first end having a coupler engaged into said cavity of said control ferrule.

7. The support device as claimed in claim 5, wherein said flexible member includes a bracket provided thereon to support the objects.

8. The support device as claimed in claim 7, wherein said flexible member includes a catch provided on said bracket to support the objects.

9. A support device for supporting and attaching objects to vehicles, said support device comprising:
    a housing for supporting the objects,
    a first and at least one second plates slidably received in said housing, and guided to move radially in and out of said housing,
    means for moving said first and said at least one second plates radially in and out of said housing, to detachably secure said housing to the vehicles, said moving means including a bolt rotatably attached to said housing, and means for coupling said bolt to said first and said at least one second plates, and said coupling means including a follower having a barrel threaded to said bolt, and a first and at least one second guide channels provided therein, and a board provided on each of said first and said at least one second plates and slidably engaged in said first and said at least one second guide channels of said follower.

10. The support device as claimed in claim 9, wherein said follower includes at least two flaps and at least two beams to define said first and said at least one second guide channels thereof respectively.

11. The support device as claimed in claim 10, wherein said at least two flaps and said at least two beams of said follower are inclined relative to said barrel of said follower.

12. The support device as claimed in claim 9, wherein said first and said at least one second plates each includes a bulge extended therefrom, and having said board provided on said bulge.

13. The support device as claimed in claim 12, wherein said follower includes at least two gaps defined between said at least two flaps thereof to slidably receive said bulges of said first and said at least one second plates.

14. A support device for supporting and attaching objects to vehicles, said support device comprising:

a housing for supporting the objects, a first and at least one second plates slidably received in said housing, and guided to move radially in and out of said housing, means for moving said first and said at least one second plates radially in and out of said housing, to detachably secure said housing to the vehicles, and means for guiding said first and said at least one second plates to move radially in and out of said housing, said guiding means including a recess formed in each of said first and said at least one second plates, and at least two fences extended from said housing and slidably engaged in said recesses of said first and said at least one second plates respectively.

15. A support device for supporting and attaching objects to vehicles, said support device comprising:

a housing for supporting the objects, a first and at least one second plates slidably received in said housing, and guided to move radially in and out of said housing, means for moving said first and said at least one second plates radially in and out of said housing, to detachably secure said housing to the vehicles, and means for guiding said first and said at least one second plates to move radially in and out of said housing, said guiding means including a cover attached to said housing and having at least two tracks provided thereon, said first and said at least one second plates are slidably engaged on said at least two tracks of said cover respectively.

16. The support device as claimed in claim 15, wherein said first and said at least one second plates each includes an extension extended therefrom and having a slot formed therein to slidably receive said at least two tracks of said cover respectively.

* * * * *